United States Patent [19]

Zavesky et al.

[11] Patent Number: 4,608,821
[45] Date of Patent: Sep. 2, 1986

[54] HEAT EXCHANGER FOR ELECTROTHERMAL DEVICES

[75] Inventors: Ralph J. Zavesky, Parma; James S. Sovey, Strongsville; Michael J. Mirtich, North Olmsted; Charalampus Marinos, Middleburg Hts.; Paul F. Penko, Berea, all of Ohio

[73] Assignee: The United States of America as represented by the Administrator of the National Aeronautics and Space Administration, Washington, D.C.

[21] Appl. No.: 636,463

[22] Filed: Jul. 31, 1984

[51] Int. Cl.[4] .............................................. H05B 7/00
[52] U.S. Cl. ...................................... 60/203.1; 219/275
[58] Field of Search ............... 60/203.1; 219/271, 274, 219/275, 374, 381, 382

[56] References Cited

U.S. PATENT DOCUMENTS

| | | | |
|---|---|---|---|
| 1,091,637 | 3/1914 | Davis | 219/271 |
| 1,803,334 | 5/1931 | Lehmann | 219/271 |
| 3,210,927 | 10/1965 | Brinich et al. | 60/35.5 |
| 3,339,260 | 9/1967 | Burne et al. | 219/381 |
| 3,350,884 | 11/1967 | Colombani et al. | 60/203 |
| 3,425,223 | 2/1969 | Browning | 60/203 |
| 3,439,501 | 4/1969 | Moore | 60/203 |
| 3,635,824 | 1/1972 | Brandes et al. | 219/381 |
| 3,718,805 | 2/1973 | Posey | 219/275 |
| 3,956,885 | 5/1976 | Davis et al. | 60/39.46 M |
| 4,038,557 | 7/1977 | Gildersleeve, Jr. et al. | 290/1 R |
| 4,106,891 | 8/1978 | Schladitz | 219/274 |
| 4,164,642 | 8/1979 | Ebert | 219/347 |
| 4,169,351 | 10/1979 | Barber | 60/203 |
| 4,211,072 | 7/1980 | Twardy et al. | 60/203 |
| 4,232,093 | 11/1980 | Miller | 244/123 |
| 4,297,563 | 10/1981 | Berry | 219/275 |
| 4,322,946 | 4/1982 | Murch et al. | 60/203.1 |
| 4,362,917 | 12/1982 | Freedman et al. | 219/10.55 F |
| 4,523,429 | 6/1985 | Bingley | 60/203.1 |

Primary Examiner—Louis J. Casaregola
Assistant Examiner—Donald E. Stout
Attorney, Agent, or Firm—Gene E. Shook; John R. Manning

[57] ABSTRACT

An electrothermal thruster utilizes a generally cylindrical heat exchanger chamber. A textured, high emissivity heater element radiatively transfers heat to the inner wall of this chamber that is ion beam morphologically controlled for high absorptivity. This, in turn, raises the temperature of a porous heat exchanger material in an annular chamber surrounding the cylindrical chamber. Propellant gas flows through the annular chamber and is heated by the heat exchanger material.

6 Claims, 2 Drawing Figures

HEAT EXCHANGER FOR ELECTROTHERMAL DEVICES

ORIGIN OF THE INVENTION

The invention described herein was made by employees of the U.S. Government and may be manufactured and used by or for the Government for governmental purposes without the payment of any royalties thereon or therefor.

TECHNICAL FIELD

This invention is concerned with improving electrothermal devices. The invention is particularly concerned with providing rugged long life heater/heat exchangers for electrothermal thrusters.

An electrothermal thruster uses resistive heaters and heat exchangers to convert electricity to heat which raises the propellant temperature. The heated propellant is accelerated in a nozzle to yield high propellant exhaust velocity or specific impulse. Very low thermal losses can be achieved through thermal insulation and effective heat transfer mechanisms making an electrothermal thruster a highly efficient device.

Many different types of heat exchangers for electrothermal propulsion devices have been suggested. These include fast heatup, thermal storage, concentric cylinder, vortex flow/heater, contact resistance, and radiative type heat exchangers.

A major problem has been encountered in the heat exchange devices of the prior art because a heating element is immersed in the propellant. This positioning causes material/propellant interactions that may lead to heat exchanger failure.

In radiative heat exchanger devices the electrical heater is not immersed in the propellant. This type of device is a less efficient heat exchanger because of the optical properties of the heating element which exhibits low emissivity as well as the receiving surface which does not have high absorptivity. Thus, such a means for heat transfer to the propellant is not desirable where high efficiency is important.

Current radiatively heated thrusters use wire heaters, in a coiled-coil form, which readily sag and do not have great potential for operating times of a few thousand hours at temperatures in excess of 1800° C. Heater lifetime may be limited because of crack flaws in the heater wire as well as grain growth and creep effects. If the heater element fails the thruster remains operational, but because of the lower specific impulse operation, larger quantities of propellant may be consumed.

It is, therefore, an object of the present invention to provide an electrothermal device with a long life, high efficiency heat exchanger having a coiled tube heater which is not exposed to flowing gas for radiatively heating a heat exchanger material in contact with the gas.

BACKGROUND ART

Davis et al U.S. Pat. No. 3,956,885 discloses an electrothermal reactor which controls the decomposition of chemical compounds and generates gas flow. In Gildersleeve U.S. Pat. No. 4,038,557 radiant energy is converted into thermal energy, utilizing forced convection through a fluidized bed.

Barber U.S. Pat. No. 4,169,351 shows an electric heater surrounded by a coaxial tubular copper jacket and a resistanceheated chamber in an electrothermal thruster. An electrothermal thruster is also disclosed in Browning U.S. Pat. No. 3,425,223. Murch et al U.S. Pat. No. 4,322,946 discloses an electrothermal thruster for satellite control.

U.S. Pat. No. 3,350,884 to Colombani et al is concerned with an electro-thermic ejector. Moore U.S. Pat. No. 3,439,501 discloses an electrothermal gas feeding system. U.S. Pat. No. 3,210,927 to Brinich et al shows an electrothermal rocket while Twardy et al U.S. Pat. No. 4,211,072 discloses the thermal decomposition of liquid fuel by an electric heating coil.

DISCLOSURE OF THE INVENTION

This invention relates to an electrothermal thruster which utilizes a generally cylindrical heat exchanger chamber with a coiled tube electrical heating element. An annular jacket filled with radiantly heated refractory metal, or ceramic particles surrounds the coiled tube heater. Propellant gas is admitted into the intake end of and flows through the annular jacket. This gas discharges into a thrust nozzle at the outlet end of the chamber.

An important feature of the invention is that the coiled tube heater element which is not in contact with the propellant gas radiatively heats a heat exchanger material which is in contact with the gas. Also, the refractory, ceramic, or cermet particles used in the heat exchanger are sized to allow the proper gas through puts while preventing clogging.

BRIEF DESCRIPTION OF THE DRAWINGS

The details of the invention will be more fully described when taken with the accompanying drawings in which.

BEST MODE FOR CARRYING OUT THE INVENTION

Figure 1:
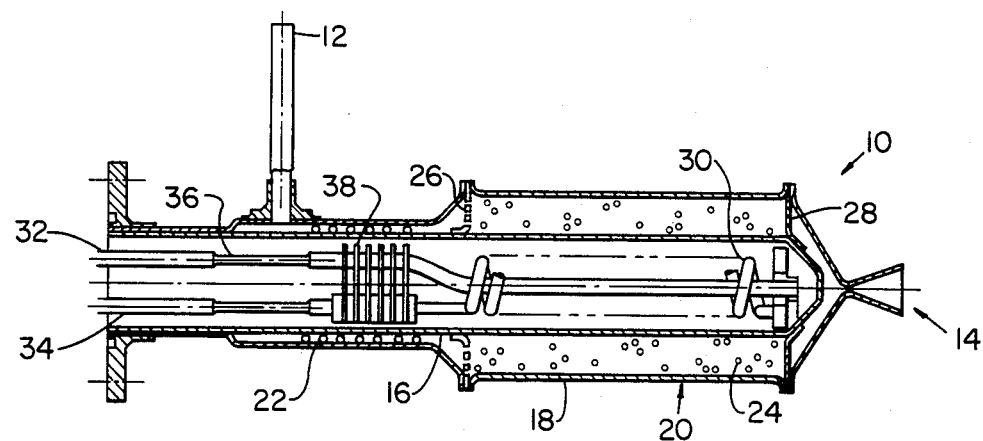
FIG. 1 is a vertical section view of an electrothermal thruster having a heat exchanger constructed in accordance with the present invention.

Referring now to the drawing there is shown in FIG. 1 an electrothermal thruster 10 having improved heat exchanger means constructed in accordance with the present invention for heating a gaseous propellant. This propellant is supplied to the thruster 10 through a supply line 12 from a suitable source (not shown). The heated propellant is discharged through a nozzle 14 in a manner well known in the art.

The heat exchanger of the present invention includes an inner hollow cylindrical housing 16. The inner surface of this housing 16 is ion beam textured to morphologically provide for high absorptivity. The outer surface of the housing 16 is similarly textured to provide for high emissivity.

An outer hollow cylindrical housing 18 surrounds the inner housing 16 in spaced relationship. The space between the inner housing 16 and the outer housing 18 forms an annular chamber 20 which serves as a conduit to conduct the propellant to the nozzle 14.

The propellant is preheated in a long path provided by a coiled wire 22 which is positioned between the inner housing 16 and the outer housing 18. This lengthened path improves the efficiency by taking heat from the housings 16 and 18 that would normally be conducted to the back of the thruster and lost.

A suitable heat exchanger material 24 is retained within the chamber 20. This material is preferably in the form of discrete refractory, ceramic, or cermet particles having diameters between about 0.001 inch and 0.100 inch. It is contemplated that the heat exchanger material 24 also may be fabricated from hydroformed refractory felt metal composed of fine wire filaments.

Annular end caps 26 and 28 are provided at opposite ends of the chamber 20 to retain the heat exchanger material 24 therein. Each of these end caps has a plurality of small drilled flow passages to enable propellant to flow through the chamber 20. The small holes in these end caps contain the particles of the heat exchanger material 24 but enable the propellant gas to throughput.

Suitable radiation shielding (not shown) may be provided around the outermost surface of the outer housing 18. The entire device is preferably enclosed in suitable insulation (not shown).

A coiled tube heater element 30 is mounted along the axis of the hollow housings 16 and 18. The surface of the heater element 30 is textured to provide for high emissivity so that heat is radiatively transferred to the inner wall of the hollow cylindrical housing 16.

The heater element 30 is connected to a suitable supply of electrical power (not shown) by leads 32 and 34. A thermal choke 36 forms a portion of each electrical lead 32 and 34 to reduce conducted thermal energy. Suitable radiation shielding 38 is provided to reduce radiated heat loss.

In operation, a gas propellant in the line 12 is supplied to the thruster 10. This propellant may be hydrogen, ammonia, nitrogen, hydrazine, steam, carbon dioxide, methane, or other suitable gases. The propellant flows through the chamber 20 where it is progressively heated by the heat exchanger material 24 whose temperature has been raised by the radiatively heated housing 16. The propellant is heated to a temperature between 1200° C. and 2200° C., preferably 2000° C. A platinum alloy is used to make the various components of the heat exchanger when the operating temperature is to be at the lower end of this range. Rhenium alloys are used for high temperature operations.

More particularly, the coiled tube heater element 30 radiatively transfers heat to the inner wall of the housing 16 which is morphologically controlled for high absorptivity. This, in turn, raises the temperature of the heat exchanger media 24 that are sized to enable efficient gas particle heat transfer and not be clogged by impurities in the propellant. The propellant passes over the porous media 24 and attains a maximum temperature prior to entering the nozzle 14 of the electrothermal thruster 10.

It is apparent that a long-life, higher efficiency heat exchanger is provided. The lifetime is increased because the coiled tube heater 30 is not exposed to the propellant flows. This eliminates propellant/material capability interactions. The tubular heater 30 can easily be operated with a 0.25 mm wall thickness which provides structured integrity and negligible sag at high temperature. Because the propellant is not in contact with the heater element 30, many different propellants may be used in the system that are compatible with the porous media only. By passing the gas over the porous media there is a more uniform heating of the gas and a shorter gas path length.

Another advantage of using this configuration is that it enables a proper value of resistance to be chosen for the heater element 30, thus allowing the use of porous media. The use of porous materials makes this heat exchanger very efficient and extremely rugged. Also, the fabrication does not depend on close tolerances thereby reducing the cost of fabrication.

Propulsion is enhanced by thermodynamic processes. Low thermal losses are attained by using radiation shielding and insulation. Effective heat transfer mechanisms from the heat exchanger material 24 and the propellant make the thruster 10 a highly efficient device. High reliability is achieved by using a rugged tube-heater which is isolated from the propellant.

DESCRIPTION OF AN ALTERNATE EMBODIMENT

Figure 2:
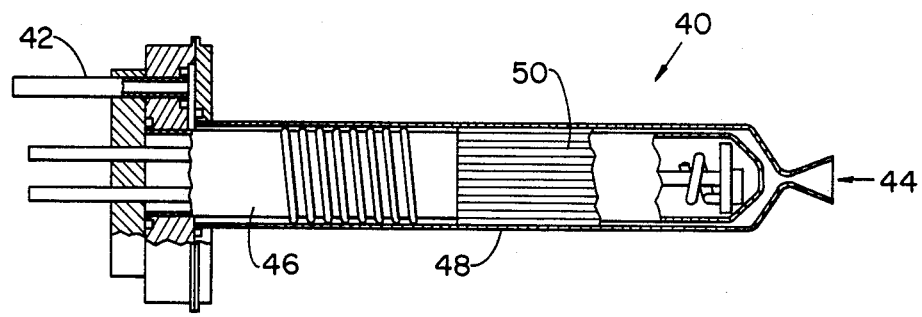
FIG. 2 is a vertical section view of an alternate embodiment of the invention.

Referring now to FIG. 2 there is shown an electrothermal thruster 40 which comprises an alternate embodiment of this invention. Propellant from a supply line 42 is heated and discharged through a nozzle 44 as in the embodiment of FIG. 1. The thruster 40 has an inner cylindrical housing 46 and an outer housing 48.

This embodiment is characterized by approximately fifty tubes 50 or circular channels milled in the annular heat exchanger. The tubes 50 replace the annular chamber 20 in FIG. 1 and contain the heat exchanger material.

Not shown in FIG. 2 are radiation shields or thermal insulation which preferably surround the heat exchanger. It is further contemplated that a swaged heater may be provided in conductive thermal contact with the inner housing 16 shown in FIG. 1. Such a heater would replace the coiled tube heater 30 for situations where lower temperature is required.

Still another alternate embodiment is contemplated in the use of a cermet rod heater in lieu of the coil tube 30. It is further contemplated that the heater/heat exchanger functions may be combined using porous cermet material.

While several embodiments of the electrothermal thruster have been described, it will be appreciated that various structural modifications may be made without departing from the spirit of the invention or the scope of the subjoined claims.

We claim:

1. A heat exchanger for heating a gaseous propellant to a temperature between about 200° C. and about 2200° C. in an electrothermal thruster having a nozzle comprising a hollow housing forming a cylindrical chamber adjacent to said nozzle, said hollow housing having a textured inner surface to provide high absorptivity and an oppositely disposed textured outer surface to provide high emissivity, an outer housing surrounding said cylindrical chamber in spaced relationship thereto thereby forming an annular chamber for conducting said gaseous propellant to said nozzle, a porous heat exchanger material selected from the group consisting of refractories, ceramics, and cermets contained within said annular chamber, housing a wire coiled about the outer surface of said hollow housing in engagement with said outer housing for providing a lengthened spiral flow path for said propellant to said annular chamber, an electrical heating element comprising a coiled tube having a wall thickness of about 0.25 mm and a textured surface for providing high emissivity mounted within said cylindrical chamber in spaced relationship with said textured inner surface for radiatively heating said hollow housing and heat exchanger material without contacting said gaseous propellant, means for supplying a gaseous propellant to said lengthened spiral flow path and seal annual chamber whereby said propellant is uniformly heated by said hollow housing and said porous heat exchanger material as it flows therethrough in a minimum gas path length, and a thermal choke formed in said electrical heating element adjacent to said coiled wire for reducing conducted thermal energy.

2. A heat exchanger as claimed in claim 1 wherein the hollow housing and the outer housing are of a material selected from the group consisting of platinum alloys and rhenium alloys.

3. A heat exchanger as claimed in claim 1 wherein the porous heat exchanger material is in the form of discrete particles.

4. A heat exchanger as claimed in claim 9 wherein the discrete particles of heat exchanger material have diameters between about 0.001 inch and about 0.100 inch.

5. A heat exchanger as claimed in claim 1 wherein the porous heat exchanger material is in the form of hydroformed refractory felt metal.

6. A heat exchanger as claimed in claim 1 including a plurality of tubes for forming said annular chamber surrounding the inner cylindrical chamber.

* * * * *

UNITED STATES PATENT AND TRADEMARK OFFICE
CERTIFICATE OF CORRECTION

PATENT NO. : 4,608,821

DATED : September 2, 1986

INVENTOR(S) : Zavesky et al

It is certified that error appears in the above-identified patent and that said Letters Patent is hereby corrected as shown below:

Column 1, line 68, cancel "resistanceheated" and insert
--resistance-heated--

Column 4, lines 59 and 60, cancel "housing"

Column 6, line 6, cancel "9" and insert --3--

Signed and Sealed this

Twenty-third Day of December, 1986

Attest:

DONALD J. QUIGG

Attesting Officer    Commissioner of Patents and Trademarks